United States Patent [19]

Komuro

[11] Patent Number: 4,936,952

[45] Date of Patent: Jun. 26, 1990

[54] METHOD FOR MANUFACTURING A LIQUID JET RECORDING HEAD

[75] Inventor: Hirokazu Komuro, Hiratsuka, Japan

[73] Assignee: Canon Kabushiki Kaisha, Tokyo, Japan

[21] Appl. No.: 370,069

[22] Filed: Jun. 23, 1989

Related U.S. Application Data

[63] Continuation of Ser. No. 20,744, Mar. 2, 1987, abandoned.

[30] Foreign Application Priority Data

Mar. 5, 1986 [JP] Japan .................................. 61-46237

[51] Int. Cl.[5] .............................................. G01D 15/16

[52] U.S. Cl. .................................... 156/643; 156/657; 156/662; 156/659.1; 156/668; 346/140 R

[58] Field of Search ............ 156/643, 651, 657, 659.1, 156/662, 664, 668; 346/140 PD

*Primary Examiner*—David L. Lacey

*Assistant Examiner*—Lori Ann Johnson

*Attorney, Agent, or Firm*—Fitzpatrick Cella Harper & Scinto

[57] ABSTRACT

A method of manufacturing a liquid jet recording head having a discharge port for discharging liquid therethrough, comprising the steps, forming thermal energy generating structure for generating thermal energy utilized for discharging recording liquid on a support member; forming an upper layer on the thermal energy generating structure; forming a photo-resist layer on the upper layer; and etching the upper layer and the photoresist layer to form a protective layer for the thermal energy generating structure.

19 Claims, 7 Drawing Sheets

METHOD FOR MANUFACTURING A LIQUID JET RECORDING HEAD

This application is a continuation of application Ser. No. 07/020,744, filed Mar. 2, 1987, now abandoned.

BACKGROUND OF THE INVENTION

1. Field of the Invention

The present invention relates to a method for manufacturing a liquid jet recording head, and more particularly to a method for manufacturing a liquid jet recording head having thermal energy generation means.

2. Related Background Art

Of the known recording methods, a liquid or ink jet recording (ink jet recording method is a non-impact recording method which does not generate noise in recording characters, enables high speed recording, and can record characters on a plane paper without special fixing process is very effective. Various proposals have been made to the liquid jet recording method and some of them have been commercialized and some of them are still under study.

In the liquid jet recording method, droplets of the recording liquid (ink) are flown by one of several actions and they are deposited to a record sheet such as a paper to record the characters.

The applicant of the present invention has proposed a novel liquid jet recording method in, for example, German Patent application No. DE284306401A1. A basic principle thereof is as follows. A thermal pulse is applied as an information signal to recording liquid in an action chamber so that the recording liquid generates vapor bubbles and self-shrinks. By a force created during the above process, the recording liquid is discharged from a liquid discharge port connected to the action chamber so that it flies as droplets, which are deposited on the record sheet to record the characters.

In this method, by using a high density multi-array structure, high speed recording and color recording are easily attained, and the construction of the apparatus is simpler than a conventional one. Accordingly. a recording head is compact and suitable for mass production. By fully utilizing advantages of IC technology and micro-machining technology which have been well developed in a semiconductor field, a long web can be easily manufactured.

A typical recording head of a liquid jet recorder used in the above liquid jet recording method is provided with thermal energy generation means for discharging recording liquid from a liquid discharge port to form flying droplets.

The thermal energy generation means is preferably arranged to directly contact the recording liquid so that the generated thermal energy effectively acts on the recording liquid and an ON-OFF response speed of the thermal action on the recording liquid is increased.

However, the thermal energy generation means basically comprises a heat generating resistive layer which generates heat when energized and a pair of electrodes for supplying a power to the heat generating resistive layer. Accordingly, if the heat generating resistive layer directly contacts the recording liquid, the recording liquid is electrolyzed by a current flowing through the recording liquid depending on an electrical resistance of the recording liquid, or the heat generating resistive layer reacts with the recording liquid when a current is supplied to the heat generating resistive layer so that the resistance of the heat generating resistive layer changes due to erosion thereof, or the heat generating resistive layer is broken or damaged.

In the past, the heat generating resistive layer has been made of an inorganic material such as NiCr alloy or metallic boronide such as $ZrB_2$ or $HfB_2$, which has a relatively excellent property as the heat generating resistive material, and a protection layer made of high anti-oxidization material such as $SiO_2$ is formed on the heat generating resistive layer to prevent the heat generating resistive layer from directly contacting the recording liquid, in order to resolve the above problems and improve the reliability and durability for repetitive use.

In forming the thermal energy generation means of the liquid jet recording head, it is common to form the heat generating resistive layer on a substrate and then stack electrodes and a protection layer thereon. The protection layer of the thermal energy generation means must uniformly cover the heat generating resistive layer and the electrodes without defects such as pinholes so that it fully functions as the protection layer to prevent breakage of the heat generating layer and short circuits between the electrodes.

In the liquid jet recording head, the electrodes are usually formed on the heat generating resistive layer and hence there is a step between the electrode and the heat generating resistive layer. Since the layer thickness is uniform at the step, the layer must be formed to completely cover the step so that there is no exposed area. If the step coverage is not complete, the exposed area of the heat generating resistive layer directly contacts to the recording liquid so that the recording liquid is electrolyzed or the recording liquid reacts with the heat generating resistive layer to break the heat generating resistive layer. The film is not homogeneous at the step. Such non-homogeneity results in concentration of thermal stress in the protection layer through repetitive heat generation and can cause cracks in the protection layer. The recording liquid can penetrate through such cracks to break the heat generating resistive layer. Further, the recording liquid may penetrate through pinholes to break the heat generating resistive layer.

In the past, in order to resolve the above problems, the thickness of the protection layer is increased to improve the step coverage and reduce the pinholes However, the thick protection layer contributes to the improvement of the step coverage and the reduction of the pinholes but impedes the supply of heat to the recording liquid, which raises the following additional problem.

The heat generated in the heat generating resistive layer conveyed to the recording layer through the protection layer. When the protection layer is thick, the thermal resistance between the protection layer which is an action plane of the heat and the heat generating resistive layer increases and hence more power must be supplied to the heat generating resistive layer. Accordingly, ① It is disadvantageous for power saving.

② Unnecessary heat is stored in the substrate and thermal response is lowered.

③ Durability of the heat generating resistive layer is lowered because of larger power.

Those problems may be resolved by reducing the thickness of the protection layer. However, in the conventional method for manufacturing the liquid jet recording head in which a film forming method such as sputtering or vapor deposition is used to form the protection layer, there is a problem of durability because of insufficient step coverage and it is difficult to reduce the thickness of the protection layer.

In the recording by the liquid jet recording head, it has been known that forming stability of the recording liquid is improved as the recording liquid is heated more rapidly. Namely, the shorter the pulse width of an electrical signal (rectangular pulse) applied to the thermal energy generation means, the better is the forming stability of the recording liquid, and the discharge stability of the flying droplet and record quality are improved. However, in the conventional liquid jet recording head, the protection layer must be thick and hence the thermal resistance of the protection layer is high. As a result, a larger thermal energy must be generated by the thermal energy generation means and the durability and the thermal response are degraded. As a result, it is difficult to reduce the pulse width and the improvement of the record quality is limited.

SUMMARY OF THE INVENTION

It is an object of the present invention to provide a novel method for manufacturing a liquid jet recording head which attains power saving, high durability and high response and improves record quality.

In order to achieve the above object, in accordance with the present invention, there is provided a method for manufacturing a liquid jet recording head comprising a liquid discharge port through which recording liquid is discharged, thermal energy generation means for supplying discharge energy to the recording liquid, and a protection layer formed on the thermal energy generation means to protect it, the thermal energy generation means having a heat generating resistive layer and at least one pair of electrodes electrically connected to the heat generating resistive layer. The protection layer is formed by stacking an upper layer on the thermal energy generation means stacking a photo-resist layer on the upper layer, and etching the upper layer while etching off the photoresist layer.

BRIEF DESCRIPTION OF THE DRAWINGS

FIGS. 4A–4F illustrate the present method, FIGS. 5 to 8 illustrate steps for manufacturing the liquid jet, recording head of the embodiment, in which FIGS. 5 and 6 show substrates prior to the formation of a protection layer, and FIGS. 7 and 8 show the substrate after the formation of the protection layer.

DETAILED DESCRIPTION OF THE PREFERRED EMBODIMENTS

Figure 1:
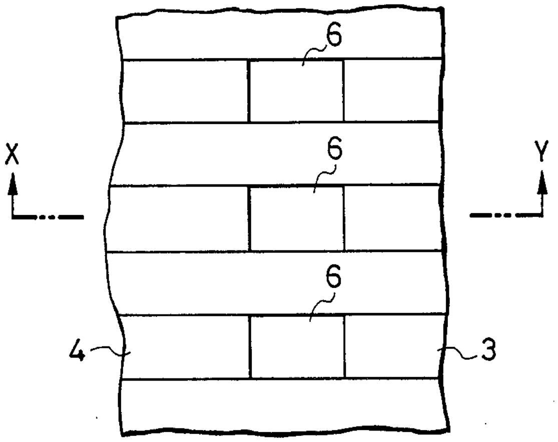
FIG. 1 shows a partial plan view of one embodiment of a liquid jet recording head manufactured by the present method.
Figure 2:
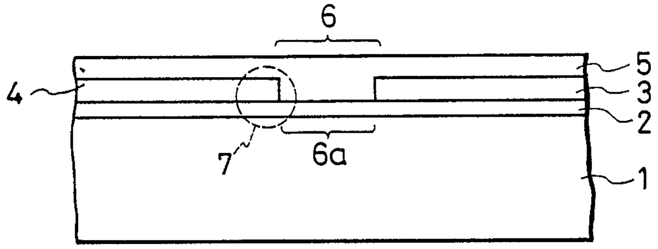
FIG. 2 shows an X-Y sectional view of FIG. 1.

FIGS. 1 and 2 show an embodiment of the liquid jet recording head manufactured by the present method. FIG. 1 shows a partial plan view of a vicinity of thermal energy generation means of the head, and FIG. 2 shows an X-Y sectional view of FIG. 1.

As shown in FIGS. 1 and 2, the liquid jet recording head is manufactured by forming at least one set of thermal energy generation means comprising a heat generating resistive layer 2 and at least one pair of electrodes 3 and 4 electrically connected to the layer 2, on a support member 1 of any shape made of glass, ceramics or plastic material, forming an upper layer which is to act as a protection layer 5, on the thermal energy generation means, stacking a photo-resist layer (not shown) on the upper layer, etching off the photo-resist layer and etching the upper layer to form the protection layer 5. Numeral 6 denotes a thermal action plane which conveys a heat generated by supplying a power to a heat generation area 6*a* of the heat generating resistive layer 2 formed between the electrodes 3 and 4, to the recording liquid, and numeral 7 denotes a step formed between the heat generating resistive layer 2 and the electrodes 3 and 4.

Figure 10:
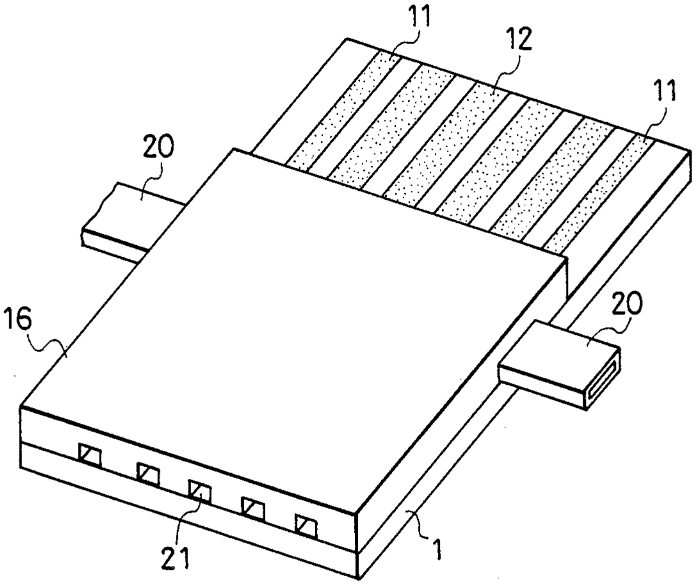
FIG. 10 shows a perspective view of a completed liquid jet recording head shown in FIGS. 1 and 2.
Figure 11:
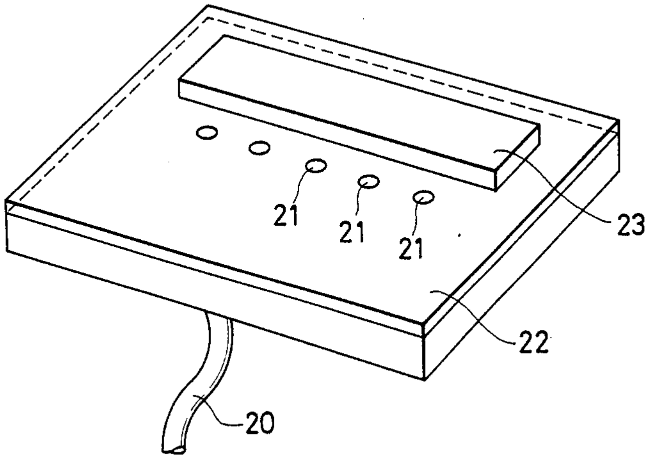
FIG. 11 is schematic perspective view of an another embodiment according to the present invention.

FIG. 10 shows a sectional view of a completed liquid jet recording head shown in FIGS. 1 and 2 manufactured in accordance with the present method. Numeral 21 denotes a liquid discharge port through which the recording liquid is discharged.

Figure 9:
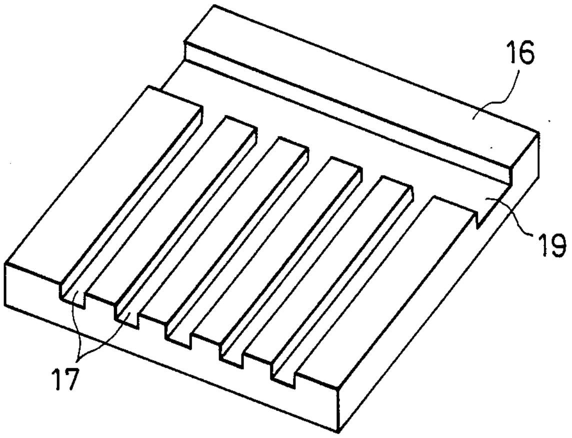
FIG. 9 shows a top plate used for a liquid jet recording head of FIG. 10.

The liquid jet recording head is manufactured, by forming the thermal energy generation means having the protection layer 5, on the support member 1, and joining to the substrate 1 a top plate 16 shown in FIG. 9 which defines action chambers one for each of the thermal energy generation means and grooves to form liquid discharge ports 21 connecting to the action chambers. In FIG. 9, numeral 17 denotes the groove which forms the liquid flow path or action chamber, and numeral 19 denotes a common liquid chamber for supplying the recording liquid to the liquid flow paths 17. A liquid supply tube 20 shown in FIG. 10 is connected to the common liquid chamber 19, and the recording liquid is supplied to the head through the liquid supply tube 20. In joining the top plate 16, it is preferable that it is carefully positioned so that the thermal energy generation means face the liquid flow paths 17.

Figure 3:
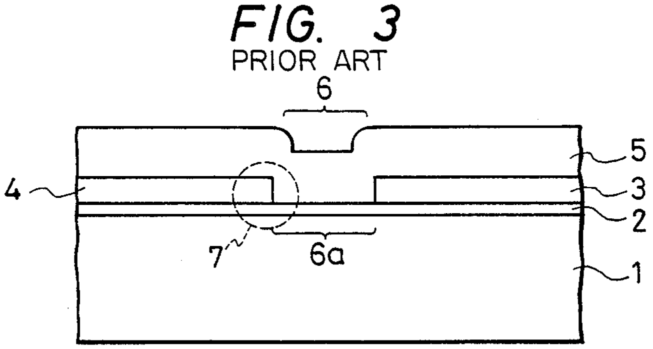
FIG. 3 PRIOR ART
FIGS. 3 and 3A shows a prior art liquid jet recording head.
Figure 3A:
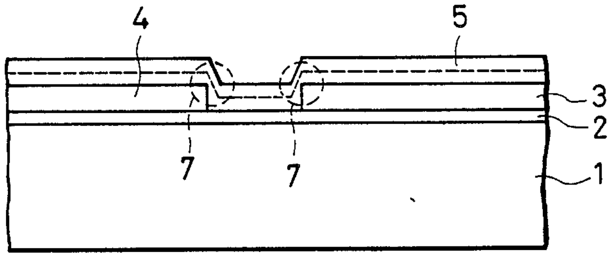
FIG. 3A PRIOR ART

In the manufacture of a conventional liquid jet recording head shown in FIGS. 3 and 3A, a layer defect such as pinhole is apt to be created in the protection layer 5. and an exposed area is apt to be created at a step 7. Accordingly, the protection layer must be thicker than necessary (normally, two times as thick as the electrode thickness). In the present invention. the protection layer 5 is formed by forming the upper layer which is to act as the protection layer 5, stacking the photo-resist layer on the upper layer, etching off the photo-resist layer and etching the upper layer, and repeating the stacking and etching of the upper layer and the photo resist layer as required. Accordingly, a layer defect such as non-homogeneity of the film which will cause pinhole or crack can be eliminated.

Since the stacking and etching of the upper layer and the photo-resist layer are repeated as required, any protection layer thickness is attained. and the problem associated with the thickening of the protection layer 5 to eliminate layer defects and improve step coverage is resolved, the power is saved and the durability and the thermal response of the liquid jet recording head are improved. In the present invention, the thickness of the protection layer may be less than 1.5 times of the electrode thickness.

In the present invention, the heat generating resistive layer, electrodes and upper layer may be made of known materials and formed by known film formation methods such as RF sputtering, chemical vapor deposition (CVD) and vacuum vapor deposition.

The photo-resist layer formed on the upper layer prior to the etching may be any photo-resist known in the art. Preferably, it has a certain fluidity during the stacking and shape retaining property during the etching. It may be set by light or heat to retain its shape.

The etching of the upper layer and the photo-resist layer may be done by any known etching technique such as wet etching with enchant, or dry etching such as sputter etching or reactive ion etching (RIE). The dry etching is preferable in view of simplicity of the process, and the RIE is most preferable. The dependency of angle in the etching rate can be utilized.

An embodiment of the method for manufacturing the liquid jet recording head of the present invention is explained with reference to FIGS. 4A to 4E.

Figure 4A:
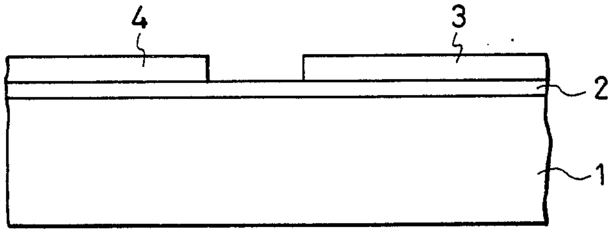

As shown in FIG. 4A, the heat generating resistive layer 2 is formed on the support member 1 by vacuum vapor deposition or sputtering. While not shown in the present embodiment for the purpose of simplicity of explanation, a functional layer such as a heat storage layer 9 shown in FIGS. 5 and 6 may be formed on the substrate 1.

An electrode layer is uniformly formed on the resistive layer 2 by vacuum vapor deposition or sputtering in order to form the electrodes 3 and 4. The electrode layer and the heat generating resistive layers 2 are patterned by a known photolithography technique to form, on the support member 1, the thermal energy generation means comprising the patterned heat generating resistive layer 2 and electrodes 3 and 4.

Figure 4B:
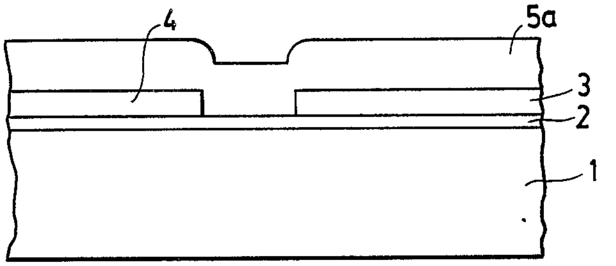

As shown in FIG. 4B, the upper layer 5*a* made of $Si_3N_4$, $SiO_2$, SiON or $Ta_2O_5$ is formed to a thickness approximately two times as large as the thickness of electrodes 3 and 4, by the vacuum vapor deposition, sputtering or CvD in order to form the protection layer on the thermal energy generation means.

Figure 4C:
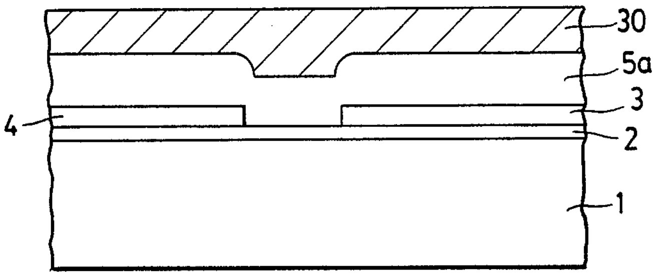

As shown in FIG. 4C, the photo-resist layer 30 is stacked on the upper layer 5*a*. This photo-resist preferably has a certain fluidity during the stacking An example is OFPR-800 (Tokyo Oka Co.,Ltd.). The photo-resist layer 30 need not necessarily be stacked on the entire surface of the upper layer 5*a* but it may be stacked on a portion thereof. However, from the standpoint of later etching, it is preferable to uniformly cover the entire surface of the upper layer 5*a*, as shown in FIG. 4C.

Figure 4D:
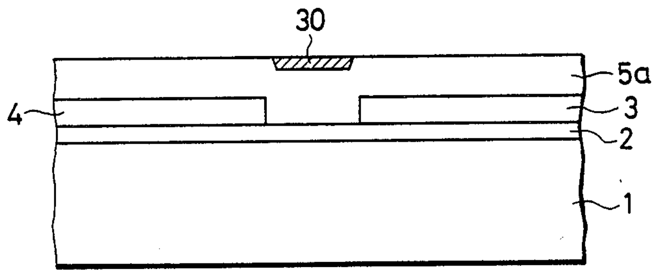
Figure 4E:
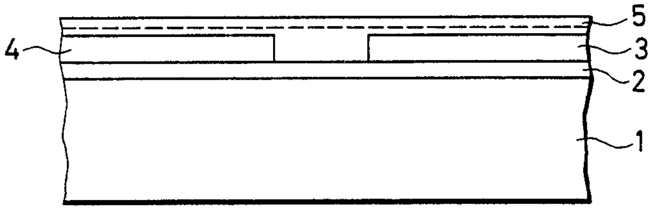

After the photo-resist layer 30 has been stacked, it is etched off by a reactive etch (RIE) machine and the upper layer 5*a* is also etched to form the protection layer 5 of a desired thickness as shown in FIG. 4E.

The etching condition such as etching gas and etching rate may be selected in accordance with the materials of the photo-resist layer and the protection layer. Preferably, the etching condition is selected such that the etching rates of the photo-resist layer 30 and the upper layer 5*a* are equal. For example. when the RIE machine is used, and the protection layer is made of $Si_3N_4$ and the photo-resist layer is made of OFPR-800, gas mixture of $CF_4$ and $H_2$ is appropriate for the etching gas.

While not described above, an exposed area is apt to be created at the step 7 and the protection layer is thickened to prevent such exposed area from being created. There is a risk that the exposed area is also created during the etching depending on the non-uniformity of the etching. In the present invention, the step is covered by the upper layer 5*a* and the photo-resist 30, and the upper layer 5*a* is etched while the photo-resist stacked on the upper layer 5*a* is etched off. Accordingly, the upper layer 5*a* including the step is uniformly etched as shown in FIG. 4E, and hence there is no risk of exposure at the step. Thus, the uniform protection layer 5 which is thinned to expose the electrodes 3 and 4 after the upper layer 5*a* is flattened is formed as shown in FIG. 4D.

The formation and etching of the upper layer 5*a* and the photo-resist layer 30 need be done only once. However, in order to improve the function of the protection layer 5, the formation and etching of the upper layer 5*a* and the photo-resist layer 30 may be repeated as shown in FIG. 4D to form the protection layer 5. In this case, it is not necessary to stack the photo-resist layers 30 on all of the repeatedly formed upper layers 5*a*, but the photo-resist layer is stacked on at least the lowermost upper layer followed by the respective stacking and etching of the upper layer 5*a*. The protection layer 5 need not be made of single material but it may be a multi-layer structure made of two or more materials in order to improve anti-cavitation property (anti-erosion Property of the protection layer 5 due to bubbles generated by the drive of the thermal energy generation means).

On the support member 1 having the thermal energy generation means and having the protection layer 5*a* formed thereon, the top plate 16 having the grooves as shown in FIG. 9 is carefully positioned and joined, and the liquid supply tube 20 for supplying the recording liquid supplied from a liquid supply system (not shown) into the head is connected to complete the liquid jet recording head shown in FIG. 10.

While not described above, the liquid discharge ports and the liquid flow paths need not be formed by the grooved plate shown in FIG. 9 but they may be formed by patterning photo-sensitive resin. The present invention is not limited to the multi-array liquid jet recording head having a plurality of liquid jet ports but it may also be applicable to a single array liquid jet recording head having one liquid discharge port.

In the present invention, since the protection layer is formed by the formation and etching of the upper layer and the photo-resist layer, and the repetition of the above steps as required, there is no layer defect such as pinhole and the high step coverage is attained together with the thin protection layer. Thus, power is saved, durability and thermal response is improved and the record quality of the liquid jet recording head is improved The liquid jet recording head shown in FIG. 10 was manufactured in the following manner.

Figure 5:
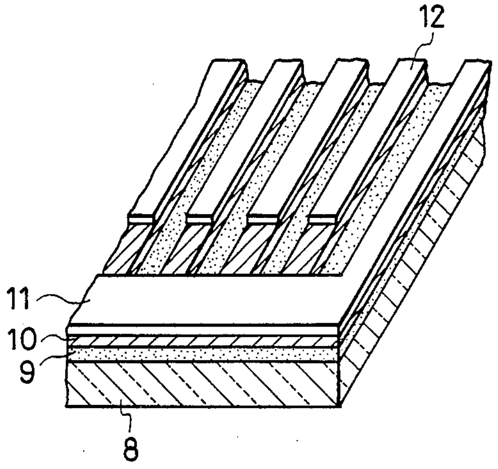
Figure 6:
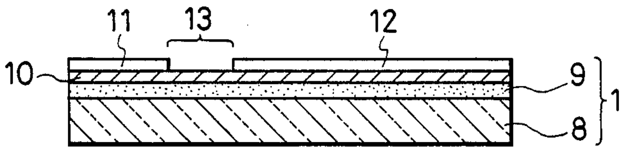

A thermal oxidization heat storage layer 9 as an underlying layer, made of $SiO_2$ and having a thickness of 5 $\mu m$ was formed on a Si wafer 8 to form the support member 1 as shown in FIGS. 5 and 6. The heat generating resistive layer 10 made of $HfB_2$ was formed to a thickness of 1300 Å on the substrate 1 by the sputtering method.

An Al layer to form the electrodes 11 and 12 was formed on the heat generating resistive layer 10 to a thickness of 5000 Å by the vacuum vapor deposition. The Al layer and the heat generating resistive layer 10 were patterned by the photolithography technique to form, on the substrate, the thermal energy generation means having a heat generation area 13 of 30 μm width by 150 μm length and a resistance (including that of the Al electrodes 11 and 12) of 100Ω. In the present embodiment, the input electrodes 12 are separate so that the thermal energy generation means are selectively energized, but the return path electrode 11 is common in order to simplify the electrode structure.

Figure 7:
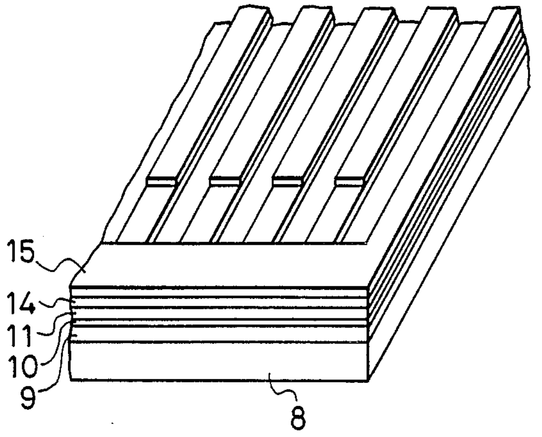
Figure 8:
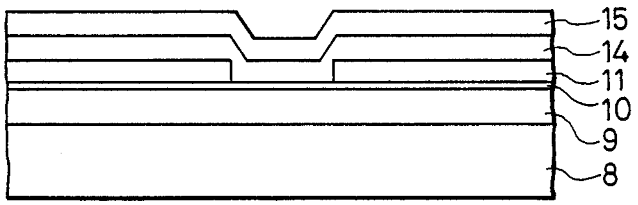

As shown in FIGS. 7 and 8, an upper layer made of $SiO_2$ was formed on the thermal energy generation means to a thickness of approximately 1 μm by the RF sputtering. The condition of formation was RF power 1 kW, and pressure $1\times10^{-3}$ Torr.

After the upper layer has been stacked, a photo-resist layer (not shown) made of OFPR-800 (Tokyo Oka Co., Ltd.) was formed on the layer 14 to a thickness of 2 μm.

Then, it was etched by the RIE machine in a gas mixture of $CF_4$:$H_2$=1:1, for 49 minutes at a pressure of 1 Torr, an RIE power of 150 W and an etching rate of 500 Å/n to form the flat upper layer having a thickness of approximately 500 Å on the electrodes and a thickness of approximately 5500 Å at the heat generating area. An $SiO_2$ layer was further stacked on the upper layer to a thickness of 2000 Å to form the first protection layer 14 having the thickness of approximately 2500 Å at the electrode and the thickness of approximately 7500 Å at the heat generating area.

In order to enhance the anti-cavitation property of the first protection layer 14, a second protection layer 15 made of Ta was formed on the first layer 14 to a thickness of approximately 500 Å by the RF sputtering to form the substrate having the first and second layers. The protection layer thus formed had a good step coverage and no layer defect such as pinhole.

On the substrate having the protection layer thus formed, the top plate 16 (made of glass) having the grooves as shown in FIG. 9 was carefully positioned and joined, and the liquid supply tube 20 was connected thereto to complete the liquid jet recording head shown in FIG. 10.

In FIG. 9, the grooves which define the liquid flow paths 17 (40 μm width by 40 μm heigth) and the common liquid chamber 19 were formed by graving the top plate 16 by a micro-cutter. In FIG. 10, lead substrate (not shown) having electrode leads for externally applying pulse signals to the head is attached to the individual electrodes 12 and the common electrode 11 so that the recording is done in accordance with the signals.

The liquid jet recording head thus manufactured offers the improvements over the conventional head in that:

(1) Power consumption is reduced by approximately 30%.

(2) Thermal response is improved by approximately 30%.

(3) Durability is high in driving with a pulse of shorter pulse width.

The discharge stability of the recording liquid is improved due to the forming stability by driving with the narrow width pulse, and record quality is improved.

In accordance with the present invention, power of the liquid jet recording head is saved, and thermal response, durability, discharge stability and record quality are improved.

In the above embodiment, the resist used in the embodiment may includes OMR-83 series (referred as a trade name of Tokyo Oka Kogyo) KMER (referred as trade name of Eastman Kodak company), and Waycoat series (roferred as a trade name of Hunt Chemical Co., Ltd.) as a cyclized rubber type photoresist, and AZ 1350 (referred as a trade name of Shipley Co., Ltd.), OFPR series (referred as a trade name of Tokyo Oka Kogyo , Waycoat (referred as trade name of Hunt Chemical Co., Ltd.), #809 (referred as a trade name of Eastman Kodak Company) and PC-129 (referred as a trade name of Polychrome Co., Ltd.) as positive type photoresist.

In the above embodiment, the first protective layer may include thin-film materials such as transition metal oxides, such as, titanium oxide, vanadium oxide, niobium oxide, molybdenum oxide, tantalum oxide, tangsten oxide, chromium oxide, zirconium oxide, hafnium oxide, lanthanum oxide, yttrium oxide. manganese oxide and the like; other metal oxides, such as aluminum oxide. calcium oxide, strontium oxide, barium oxide, silicon oxide and the like; and complexes of the above metals; high dielectric nitride, such as silicon nitride, aluminum nitride, boron nitride, tantalum nitride and the like; complexes of the above oxides and nitrides. Further, the second protective layer may include, an element of the group III*a* of the periodic table such as Sc or Y, an element of the group IVa such as Ti, Tr or Hf, an element of the group Va such as v or Nb, an element of the group VIa such as Cr. Mo or W, an element of the group VIII such as Fe, Co or Ni, an alloy of the above metals such as Ti-Ni, Ta-W, Ta-Mo-Ni, Ni-Cr, Fe-Co, Ti-W, Fe-Ti, Fe-Ni, Fe-Cr, Fe-Ni-Cr, a boride of the above metals such as Ti-B, Ta-B, Hf-B or W-B, a carbide of the above metals such as Ti-C, Zr-C, V-C, Ta-C, Mo-C, or Ni-C, and a silicide of the above metals such as Mo-Si, W-Si or Ta-Si, and a nitride of the above metals such as Ti-N, Nb-N or Ta-N.

The underlying layer principally functions as a layer to control conduction of the heat generated by the heat generating portion to the support. The material and the film thickness of the underlying layer are selected such that the heat generated by the heat generating portion is more conducted to the heat applying portion when the thermal energy is to be applied to the liquid in the heat applying portion. and the heat remaining in the heat generating portion is more rapidly conducted to the support when the heat conduction to the heating portion 202 is blocked. The material of the underlying layer 206 includes, in addition to $SiO_2$ described above, inorganic materials as represented by metal oxides such as zirconium oxide, tantalum oxide, magnesium oxide and aluminum oxide.

The material of the heat generating resistive layer may be any material which generates a heat when energized.

Preferable examples of such materials are tantalum nitride, nickel-chromium alloy, a silver-palladium alloy, silicon semiconductor. or metals, such as hafnium, lanthanum, zirconium, titanium, tantalum, tungsten, olybdenum, niobium, chromium, vanadium etc., alloys and borides thereof.

Of the materials of the heat generating resistive layer. the metal borides are particularly suitable, and of those, performance may be placed on hafnium boride for its most excellent property, and there follow zirconium boride, lanthanum boride, tantalum boride, vanadium bomide and niobium boride in the other as mentioned.

The heat generating resistive layer can be formed of those materials by an electron beam vapor deposition process or a sputtering process.

The film thickness of the heat generating resistive layer is determined in accordance with an area and material thereof and a shape and a size of the heat applying portion and a power consumption so that a desired heat per hour may be generated. Usually, it is 0.001–5 μm and preferably 0.01–1 μm.

The material of the electrode may be any conventional electrode material such as Al, Ag, Au, Pt or Cu. It is formed by those materials into desired size, shape and thickness at a desired position by a vapor deposition process.

Further, when in the above embodiment the first protective layer 14 has sufficient anti-cavitation resistance, the second protective layer 15 (in FIG. 8) may be deleted.

What I claim is:

1. A method of manufacturing a substrate for a liquid jet recording head that discharges liquid in response to activation of thermal energy generating means, said method comprising the steps:

providing a support member having thermal energy generating means disposed thereon, said thermal energy generating means comprising a heated resistor layer and at least one electrode connected thereto with a step between said electrode and said heater resistor layer;

forming a protective layer over said thermal energy generating means;

forming a substantially uniform photo-resist layer over said protective layer;

etching said photo-resist layer until a portion of said protective layer is exposed; and continuing to etch said protective layer and said photo-resist layer to leave at least a portion of said protective layer to thereby protect said thermal energy generating means.

2. A method for manufacturing a liquid jet recording head having a liquid path in communication with a discharge port for discharging liquid, the liquid jet recording head including a support member, thermal energy generating means on said support member for generating thermal energy to discharge the liquid, and a member in which grooves are provided to form the liquid path, the method comprising the steps of:

providing a support member having thermal energy generating means disposed thereon, said thermal energy generating means comprising a heater resistor layer and at least one electrode connected thereto with a step between said electrode and said heater resistor layer;

forming a protective layer over said thermal energy generating means;

forming a substantially uniform photo-resist layer over said protective layer;

etching said photo-resist layer until a portion of said protective layer is exposed;

continuing to etch said protective layer and said photo-resist layer to leave at least a portion of said protective layer to thereby protect said thermal energy generating means; and connecting said support member with a grooved member, said grooved member having grooves formed thereon, said thermal energy generating means being positioned in said grooves.

3. A method for manufacturing a substrate for a liquid jet recording head having such substrate as a support member, thermal energy generating being provided on said support member for generating thermal energy to discharge liquid, the method comprising the steps of;

providing a support member having thermal energy generating means disposed thereon, said thermal energy generating means comprising a heater resistor layer and at least one electrode connected thereto with a step between said electrode and said heater resistor layer;

forming a protective layer over said thermal energy generating means;

forming a substantially uniform second layer over said protective layer;

etching said second layer until a portion of said protective layer is exposed; and continuing to etch said protective layer and said second layer to leave at least a portion of said protective layer thereby protecting said thermal energy generating means.

4. A method for manufacturing a liquid jet recording head having a liquid path in communication with a discharge port for discharging liquid, the liquid jet recording including a substrate which forms a support member, thermal energy generating means provides on said support member for generating thermal energy to discharge the liquid, and a member in which grooves are provided to form the liquid path, the method comprising the steps of:

providing a support member having thermal energy generating means disposed thereon, said thermal energy generating means comprising a heater resistor layer and at least one electrode connected thereto with a step between said electrode and said heater resistor layer:

forming a protective layer over said thermal energy generating means;

forming a substantially uniform second layer over said protective layer;

etching said second layer until a portion of said protective layer is exposed;

continuing to etch said protective layer and said second layer to leave a least a portion of said protective layer thereby protecting said thermal energy generating means; and connecting said support member with a grooved member, said grooved member having grooves formed thereon and said thermal energy generating means being positioned in said grooves.

5. A method according to claim 1, 2, 3 or 4, further comprising the step of forming a heat accumulation layer under said thermal energy generating means.

6. A method according to claim 1, 2, 3 or 4, wherein said continuing to etch step is performed by a wet etching method.

7. A method according to claim 1, 2, 3 or 4, wherein said protective layer is made of $Si_3N_4$.

8. A method according to claim 1, 2, 3 or 4, wherein said protective layer is made of $SiO_2$.

9. A method according to claim 1, 2, 3 or 4, wherein said protective layer is made of SiON.

10. A method according to claim 1, 2, 3 or 4, wherein said protective layer is made of $Ta_2O_5$.

11. A method according to claim 1, 2, 3 or 4, wherein the thickness of said protective layer after said continuing to etch step is about 1.5 times that of said electrode.

12. A method according to claim 1, 2, 3 or 4, wherein said protective layer forming step, said substantially uniform, layer forming step, said etching step and said continuing to etch step are repeatedly performed.

13. A method according to claim 1, 2, 3 or 4, wherein in said continuing to etch step, the etching rate of said substantially uniform layer and said protective layer are substantially equal.

14. A method according to claim 1, 2, 3 or 4, wherein the thickness of said protective layer formed in said protective layer forming step is about two times that of said electrode.

15. A method according to claim 14, further comprising the step of forming a heat accumulation layer under said thermal energy generating means.

16. A method according to claim 1, 2, 3 or 4, wherein said continuing to etch step is performed by a dry etching method.

17. A method according to claim 16, further comprising the step of forming a heat accumulation layer under said thermal energy generating means.

18. A method according to claim 16, wherein said dry etching method is a sputter etching method.

19. A method according to claim 16, wherein said dry etching method is a reactive ion etching method.

* * * * *

UNITED STATES PATENT AND TRADEMARK OFFICE

CERTIFICATE OF CORRECTION

PATENT NO. : 4,936,952

DATED : June 26, 1990

INVENTOR(S) : HIROKAZU KOMURO

It is certified that error appears in the above-identified patent and that said Letters Patent is hereby corrected as shown below:

ON TITLE PAGE:

AT [56] REFERENCES CITED

U.S. Patent Documents, insert

| | | | |
|---|---|---|---|
| --4,336,548 | 6/82 | Matsumoto | 346/140R |
| 4,339,762 | 7/82 | Shirato et al. | 346/140R |
| 4,361,842 | 11/82 | Haruta, et al. | 346/1.1 |
| 4,429,321 | 1/84 | Matsumoto | 346/140R |
| 4,437,100 | 3/84 | Sugitani, et al. | 346/1.1 |
| 4,450,457 | 5/84 | Miyachi, et al. | 346/140R |
| 4,470,874 | 9/84 | Bartush, et al. | 156/659.1 |
| 4,536,250 | 8/85 | Ikeda, et al. | 156/651 |
| 4,541,893 | 9/85 | Knight | 156/659.1 |
| 4,560,421 | 12/85 | Maedo, et al. | 156/659.1 |
| 4,567,493 | 1/86 | Ikeda, et al. | 346/140R |
| 4,663,640 | 5/87 | Ikeda, et al. | 346/140R |
| 4,666,823 | 5/87 | Yokota, et al. | 346/140R |
| 4,687,543 | 8/87 | Bowker | 156/659.1 |
| 4,686,544 | 8/87 | Ikeda, et al. | 346/140R--. |

Attorney, Agent, or Firm,
"Fitzpatrick Cella Harper & Scinto" should read
--Fitzpatrick, Cella, Harper & Scinto--.

COLUMN 1

Line 19, "plane" should read --plain--.
Line 42, "Accordingly." should read --Accordingly,--.

COLUMN 2

Line 32, "to" should be deleted.
Line 53, "recording layer" should read
--recording liquid--.

UNITED STATES PATENT AND TRADEMARK OFFICE
CERTIFICATE OF CORRECTION

PATENT NO. : 4,936,952

DATED : June 26, 1990

INVENTOR(S) : HIROKAZU KOMURO

It is certified that error appears in the above-identified patent and that said Letters Patent is hereby corrected as shown below:

COLUMN 6

Line 27, "Property" should read --property--.

COLUMN 8

Line 57, "olyb-" should read --molyb---.
Line 62, "performance" should read --preference--.
Line 65, "bomide" should read --boride-- and "other" should read --order--.

COLUMN 9

Line 23, "heated" should read --heater--.
Line 68, "thermal energy generating" should read --thermal energy generating means--.

UNITED STATES PATENT AND TRADEMARK OFFICE

CERTIFICATE OF CORRECTION

PATENT NO. : 4,936,952

DATED : June 26, 1990

INVENTOR(S) : HIROKAZU KOMURO

It is certified that error appears in the above-identified patent and that said Letters Patent is hereby corrected as shown below:

COLUMN 10

Line 22, "cording" should read --cording head--.
Line 23, "provides" should read --provided--.
Line 46, "thereon" should read --thereon,--.
Line 67, "uniform," should read --uniform--.

Signed and Sealed this

Twelfth Day of May, 1992

*Attest:*

DOUGLAS B. COMER

*Attesting Officer*

*Acting Commissioner of Patents and Trademarks*